2,903,366
METHOD OF CURING PORK PRODUCTS

Hugh W. Barnett, Clarkson, Ontario, Canada, assignor to Canada Packers, Limited, Toronto, Ontario, Canada No Drawing. Application August 29, 1955
Serial No. 531,297

4 Claims. (Cl. 99—159)

This invention relates to an improved process and composition for preparing cured meat, and, in particular, to a process and composition for effecting a quick cure in meats to be further processed by smoking and/or cooking.

In modern packing-house practice, hams, picnics, bacon, butts, and other meat cuts are cured by injecting directly into the meat a curing pickle such as a mixture of salt, sugar, sodium nitrate and sodium nitrite dissolved in water. This is known as pumping process, and the solution is termed a "pumping pickle." In the case of large cuts of meat, such as hams, the pickle is pumped directly into the artery of the ham or other cut, and is in this manner conveyed to all parts of the cut by means of the natural vascular system. In other cases, where this method is not possible or practical, the meat is injected with pickle through hollow needles, each needle, or stroke of a needle, discharging pickle to a local area. This procedure is known as "spray pumping." After the pickle injection by one of these methods, the meat cuts are immersed in a second pickle for varying lengths of time, and are then withdrawn and usually matured by holding for a further length of time at a relatively low temperature.

Depending upon the type of product desired, the cured cuts may then be smoked and/or cooked. During such processing operation, the meat protein is coagulated and water is driven off, resulting in a loss in weight generally known as the "processing shrink" which is of the utmost importance in determining the margin of profit which will be obtained from any given cut of meat. Since some protein is always dissolved in the water this processing shrink also involves a loss of essential nutrient. "Processing shrink," as used herein broadly includes "cooking shrink" or "smoking shrink" the latter terms depending upon the particular method of processing the meat.

Many factors, such as the time and temperature of the process, the amount of the initial pickle injection, etc., can influence the amount of shrink taken, and recent work has indicated that over a narrow range the amount of shrink is inversely proportional to the pH value of the lean meat, all other factors being equal. This last relationship has led to several attempts to decrease the processing shrink through the use of weak alkalies or weakly alkaline salts in the pickle solution in order to increase the pH of the meat cuts to a value within a preferred range. To such weakly alkaline pickle solutions were sometimes added suitable substances for inhibiting bacterial action which is known to increase with an increase in the pH of meat over a limited range. One such process, as described in U.S. Patent 2,596,067, utilizes disodium phosphate in a pumping pickle in order to reduce the cooking shrink of cooked and canned hams. Other weakly alkaline salts such as sodium carbonate and sodium bicarbonate are said to be generally useful where optimum results are not required. Another process, as described in U.S. Patent 2,513,094, utilizes sodium tripolyphosphate, sodium hexametaphosphate or other molecularly dehydrated phosphates having a molar ratio of $Na_2O$ to $P_2O_5$ not greater than about 1.7 to 1, in a curing solution to control pH and to prevent the production of undesirable color in meat products. It has also been proposed to utilize various combinations of weakly alkaline phosphates and other salts with the idea of buffering the meat at a desired pH value.

Some of the alkaline compounds and compositions previously suggested have relatively low solubilities, particularly in a highly concentrated pumping pickle, and present difficulties in preparation and maintenance of a proper solution level. Moreover, it has been found that treatment of meats with curing solutions containing some of the previously mentioned weakly alkaline salts in sufficient concentration to effect the desired pH adjustment results in undesirable deposition of crystals of the alkaline salt on the surface of the meat.

It has now been discovered that trisodium phosphate unexpectedly provides better results in meat-curing pickle than any of the previously known alkalies.

Although trisodium phosphate is generally regarded as a highly soluble strong alkali, it has nevertheless been found that this compound in a meat-curing pickle provides extremely beneficial results with respect to yield, reduction in cooking and smoking shrink, enhancement of flavor and aroma, etc., while requiring no special buffering salts, and presenting substantially no difficulties due to over tenderization. Thus, conventional curing solutions to which trisodium phosphate has been added may be utilized for arterial injection or for spray pumping followed by cooking and canning or smoking, and will provide high yields, quick cures, reduction in cooking or smoking shrink without encountering the difficulties due to local over tenderization. Moreover, there is no tendency of the trisodium phosphate salt to crystallize out on the surface of the meat product, as has been encountered with some of the mildly alkaline phosphates previously used.

Accordingly, an object of the present invention is to provide a curing solution and process avoiding the aforementioned difficulties, and whereby processing shrinkage is materially reduced.

Another object of the invention is to provide a curing solution and process for curing meat whereby color stability, resistance to bacterial action, and tenderness are increased, and flavor and aroma are enhanced.

Another object of the invention is to provide a novel pumping pickle solution and process for curing meat whereby such meat can be treated by either arterial injection or by spray pumping, followed by cooking and canning or smoking to produce a ready-to-serve product.

A still further object of the invention is to provide a pickle solution and process for curing meat whereby the pH value of the meat may be raised to a desirable value without depositing salt crystals on the surface of the meat.

These and other objects and advantages, which will become apparent from the ensuing description, are accomplished by the incorporation of a suitable amount of trisodium phosphate into a conventional pumping pickle containing sodium chloride, sugar, sodium nitrite and sodium nitrate, and in an amount sufficient to provide a desired pH range in a cut of meat to be treated.

In general, the amount of trisodium phosphate which may be added to the usual pumping pickle with good results is in the range of from 0.5% to 5.0% by weight based on the anhydrous salt. It has been found, however, that the reduction in shrink is not improved by using a concentration greater than about 3.0%. Excellent results are obtained when the concentration is between 2% and 3%, with a concentration of about 2.2% being preferred, since it provides good results with the use of very moderate amounts of phosphate. The pH value of the resulting pumping pickle incorporating trisodium phosphate is about 12. However, pH at this level is not particularly significant and is, in fact, difficult to measure. The acid-binding capacity, i.e. a concentration of alkali, is more important, and is not directly proportional to pH. The amount of trisodium phosphate in solution is generally sufficient to raise the pH of a cut of meat to a preferred value within the range of about 6.4 to about 6.8, when using the usual amount of pickle solution. It has been observed that the pH of a low pH cut of meat, such as a ham, is raised more than that of a high pH cut with the same amount of solution. Thus, when injecting a ham of pH 5.5, the pH may be raised a whole pH unit to 6.5. However, when injecting a ham of pH 6.3, the pH may rise by only 0.5 unit to a final value of 6.8. Thus, it is usually not necessary to adjust concentrations and amounts of pickle solution when treating hams of different initial pH values.

In general, the quantity of pickle solution injected into the meat is at least about ten percent although slightly lower quantities as well as considerably higher quantities may be employed. Thus, quantities as high as twenty percent may in some instances be used. It will be understood that lower concentrations of phosphate within the preferred range may be used where high quantities of pickle solution are employed, than would be utilized with low quantities of pickle solution.

The following examples illustrate the effect of varying quantities of trisodium phosphate in a conventional pumping pickle containing salt, sugar, sodium nitrite and sodium nitrate:

EXAMPLE 1

A pumping pickle containing the usual amounts of sodium chloride, sugar, sodium nitrate, sodium nitrite, and water, was prepared and warmed to approximately 60° F. This pickle was divided into two parts. The first part was further divided into different parts to which different amounts of trisodium phosphate, calculated on the anhydrous basis, were added. No trisodium phosphate was added to the second part. A number of hams were obtained from freshly chilled hogs. One ham from each hog was pumped arterially with 10% by weight of pickle containing trisodium phosphate. The corresponding ham from each hog was pumped arterially with 10% by weight of pickle to which no phosphate had been added. The hams were then covered with a curing pickle prepared according to standard practice. Curing was continued for a period of ten days. After the curing period, the hams were boned, defatted, pressed into molds, and cooked in water to an internal temperature of 158° F. The comparative losses in weight of the trisodium phosphate pickle treated and regular treated hams during the processing are given in the following tables. The organoleptic ratings accorded the products by a panel of experts are also set forth.

TABLE I

*Effect of 0.5% T.S.P. in pumping pickle on shrink of cooked hams*

| Hog No. | Ham | Treatment | Percent Cooking Shrink |
|---|---|---|---|
| 1 | Right | No T.S.P. | 15.2 |
| 2 | do | do | 18.1 |
| 3 | do | do | 16.4 |
| 4 | do | do | 18.5 |
| Average | | | 17.05 |
| 1 | Left | 0.5% T.S.P. | 14.5 |
| 2 | do | do | 15.0 |
| 3 | do | do | 14.4 |
| 4 | do | do | 15.0 |
| Average | | | 14.7 |

The average reduction in shrink due to the use of 0.5% T.S.P. is 2.35%.

ORGANOLEPTIC RATINGS—PANEL OF 9

| | Prefer No T.S.P. | Prefer 0.5% T.S.P. | No Preference |
|---|---|---|---|
| Slightly Better | 2 | | |
| Mod. Better | 1 | | |
| Decidedly Better | 2 | 1 | |
| Total | 5 | 1 | 3 |

TABLE II

*Effect of 1.0% T.S.P. in pumping pickle on shrink of cooked hams*

| Hog No. | Ham | Treatment | Percent Cooking Shrink |
|---|---|---|---|
| 1 | Right | No T.S.P. | 21.9 |
| 2 | do | do | 17.3 |
| 3 | do | do | 20.2 |
| 4 | do | do | 20.3 |
| Average | | | 19.9 |
| 1 | Left | 1.0% T.S.P. | 15.7 |
| 2 | do | do | 14.0 |
| 3 | do | do | 15.5 |
| 4 | do | do | 19.0 |
| Average | | | 16.0 |

The average reduction in shrink due to the use of 1.0% T.S.P. is 3.9%.

ORGANOLEPTIC RATINGS—PANEL OF 9

| | Prefer No T.S.P. | Prefer 1.0% T.S.P. | No Preference |
|---|---|---|---|
| Sl. Better | 3 | 3 | |
| Mod. Better | | 2 | |
| Dec. Better | | | |
| Total | 3 | 5 | 1 |

TABLE III

*Effect of 2.0% T.S.P. in pumping pickle on shrink of cooked hams*

| Hog No. | Ham | Treatment | Percent Cooking Shrink |
|---|---|---|---|
| 1 | Right | No T.S.P. | 13.8 |
| 2 | do | do | 19.4 |
| 3 | do | do | 19.2 |
| 4 | do | do | 18.2 |
| Average | | | 17.65 |
| 1 | Left | 2.0% T.S.P. | 9.4 |
| 2 | do | do | 12.1 |
| 3 | do | do | 12.0 |
| 4 | do | do | 11.9 |
| Average | | | 11.35 |

The average reduction in shrink due to the use of 2.0% T.S.P. is 6.3%.

ORGANOLEPTIC RATINGS—PANEL OF 9

| | Prefer No T.S.P. | Prefer 2.0% T.S.P. | No Preference |
|---|---|---|---|
| Slightly Better | 2 | 1 | |
| Mod. Better | | 2 | |
| Decidedly Better | 1 | 2 | |
| Total | 3 | 5 | 1 |

TABLE IV

*Effect of 3.0% T.S.P. in pumping pickle on shrink of cooked hams*

| Hog No. | Ham | Treatment | Percent Cooking Shrink |
|---|---|---|---|
| 1 | Right | No T.S.P. | 18.3 |
| 2 | do | do | 20.0 |
| 3 | do | do | 19.7 |
| 4 | do | do | 20.2 |
| Average | | | 19.55 |
| 1 | Left | 3.0% T.S.P. | 11.5 |
| 2 | do | do | 12.4 |
| 3 | do | do | 9.7 |
| 4 | do | do | 9.6 |
| Average | | | 10.8 |

The average reduction in shrink due to the use of 3.0% T.S.P. is 8.75%

ORGANOLEPTIC RATINGS—PANEL OF 9

| | Prefer No T.S.P. | Prefer 3.0% T.S.P. | No Preference |
|---|---|---|---|
| Slightly Better | | 3 | |
| Mod. Better | | 3 | |
| Decidedly Better | | 3 | |
| Total | | 9 | |

TABLE V

*Effect of 4.0% T.S.P. in pumping pickle on shrink of cooked hams*

| Hog No. | Ham | Treatment | Percent Cooking Shrink |
|---|---|---|---|
| 1 | Right | No T.S.P. | 18.9 |
| 2 | do | do | 18.6 |
| 3 | do | do | 19.2 |
| 4 | do | do | 21.9 |
| Average | | | 19.65 |
| 1 | Left | 4.0% T.S.P. | 12.0 |
| 2 | do | do | 10.7 |
| 3 | do | do | 10.5 |
| 4 | do | do | 12.0 |
| Average | | | 11.30 |

The average reduction in shrink due to the use of 4.0% T.S.P. is 8.35%.

ORGANOLEPTIC RATINGS—PANEL OF 9

| | Prefer No T.S.P. | Prefer 4.0% T.S.P. | No Preference |
|---|---|---|---|
| Slightly Better | 1 | 3 | |
| Mod. Better | | 4 | |
| Decidedly Better | | 1 | |
| Total | 1 | 8 | |

TABLE VI

| Conc. of T.S.P., percent | Reduction in Cooking Shrink, percent |
|---|---|
| 0.5 | 2.35 |
| 1.0 | 3.9 |
| 2.0 | 6.3 |
| 3.0 | 8.75 |
| 4.0 | 8.35 |

It will be noted from the foregoing tables that the cooking shrink was less in every instance in which the trisodium phosphate pickle was used. The reduction in cooking shrink reached a maximum of 8.75% at 3% trisodium phosphate, and then tapered off to 8.35% at 4% trisodium phosphate. The reduction in cooking shrink at a concentration of 2% trisodium phosphate was 6.3%. The organoleptic rating was 5 to 3 in favor of trisodium phosphate at 2.0% concentration and 9 to 0 in favor of trisodium phosphate at 3% concentration, as compared with regular pickle treated products. It was therefore decided to use a concentration of about 2.2% trisodium phosphate, as this appeared to give about optimum results with a minimum of phosphate. The following examples are based on the use of 2.2% phosphate curing pickle.

EXAMPLE 2

Paired hams from four hogs were pumped arterially with 10% by weight of pickle, one ham of each pair with pickle containing 2.2% trisodium phosphate, and the corresponding ham of each pair containing no trisodium phosphate. After the normal curing period, the hams were boned, defatted, pressed into molds, and cooked in water to an internal temperature of 158° F. The comparative losses in weight of the treated and untreated hams are given in the following table:

TABLE VII

*Effect of 2.2% trisodium phosphate on cooking shrink of cooked ham*

| Hog No. | Percent Cooking Shrink | |
|---|---|---|
| | Regular Pickle | Regular Pickle + 2.2% T.S.P. |
| 1 | 16.8 | 11.0 |
| 2 | 16.5 | 10.8 |
| 3 | 19.5 | 12.1 |
| 4 | 24.2 | 13.6 |
| Average | 19.2 | 11.9 |

NOTE—In each case, control and treated hams are left and right hams from the same hog.

Average reduction in cooking shrink using 2.2% T.S.P. is 7.3%.

In addition to very substantially reducing the shrinkage the 2.2% trisodium phosphate pickle treatment increased the tenderness, flavour, and aroma, and increased the resistance of the hams to discoloration.

EXAMPLE 3

The procedure of Example 2 was repeated on a production scale. Seventy-five hams, weighing 1155 pounds, were pumped with pickle containing 2.2% trisodium phosphate. A similar lot was pumped with the same amount of regular pickle of the same composition except that it contained no phosphate. The loss in weight during the cooking of the regular pickle treated hams was 16.8%. The loss in weight of the trisodium-phosphate treated hams was only 10.1%. Reduction in shrink due to use of 2.2% trisodium phosphate was 6.7% on a production basis.

EXAMPLE 4

A pumping pickle containing the usual amounts of sodium chloride, sugar, sodium nitrate, sodium nitrite and water, was prepared and warmed to approximately 60° F. This pickle was divided into two parts. To the first part 2.2% by weight of trisodium phosphate, calculated on the anhydrous basis, was added. No trisodium phosphate was added to the second part.

Eighteen hams were obtained from 9 freshly chilled hogs. One ham from each hog was pumped arterially with 10% by weight of pickle containing the trisodium phosphate. The corresponding ham from each hog was pumped arterially with 10% by weight of the regular pickle. The hams were then covered with a curing pickle prepared according to the standard practice. Curing was continued for a period of 12 days. Following washing and part skinning, the hams were placed in stockinettes and hung in a smokehouse. The smoking period was 20 hours, to an internal temperature of 158° F. In every case, the ham treated with trisodium phosphate pickle lost less weight during processing than the corresponding ham pumped with regular pickle. The results are given in the following table:

TABLE VIII

*Effect of trisodium phosphate on shrink of ready-to-serve smoked hams*

| Hog No. | Percent Smoking Shrink | |
|---|---|---|
| | Regular Pickle | Regular Pickle + 2.2% T.S.P. |
| 1 | 9.9 | 9.0 |
| 2 | 10.7 | 8.9 |
| 3 | 15.0 | 10.8 |
| 4 | 11.8 | 10.4 |
| 5 | 11.5 | 7.1 |
| 6 | 12.2 | 9.9 |
| 7 | 12.7 | 11.0 |
| 8 | 10.1 | 9.4 |
| 9 | 12.2 | 10.2 |
| Average | 11.8 | 9.6 |

Average decrease in shrink with T.S.P. is 2.2%.
NOTE.—In each case, control and treated hams are left and right hams from the same hog.

The hams were cut and sampled "blind" by a taste panel. Majority preference in each case was for the ham treated with trisodium phosphate. Exposure tests indicated increased resistance to discoloration and improved flavor and aroma retention in the trisodium phosphate treated hams.

EXAMPLE 5

In order to illustrate the use of trisodium phosphate pickle in spray pumping followed by long smoking to produce a ready-to-serve smoked product, eight picnics were obtained from four freshly chilled hogs. One picnic from each hog was spray pumped with a 12 percent by weight of pickle containing 2.2% trisodium phosphate. The corresponding picnic from each hog was spray pumped with 12 percent by weight of regular pickle. The spray-pumped picnics were then covered with a curing pickle prepared according to standard practice and permitted to cure for 12 days. After curing, they were washed, stockinetted, and smoked for 20 hours to a temperature of 158° F. to provide a ready-to-serve product.

The yield of ready-to-serve smoked product from the fresh weight was substantially higher in the picnics treated with the 2.2% trisodium phosphate pickle as will be observed from the following table:

TABLE IX

*Effect of trisodium phosphate on yield of ready-to-serve smoked picnics*

| Hog No. | Percent Yield from Fresh Weight | |
|---|---|---|
| | Regular Pickle | Regular Pickle + 2.2% Trisodium Phosphate |
| 1 | 98.9 | 102.0 |
| 2 | 96.6 | 99.8 |
| 3 | 98.4 | 102.5 |
| 4 | 98.8 | 101.0 |
| Average | 97.2 | 101.0 |

Average increase in yield due to use of 2.2% trisodium phosphate is 3.8%.

Again, the majority preference of the taste panel was for the trisodium phosphate treated picnics, and the same effect of increased color stability and flavor retention was noted, as with the arterially-injected products. No localized over-tenderization could be observed.

EXAMPLE 6

In order to show how the use of trisodium phosphate compares with previously suggested phosphates, a number of tests were run under the same processing conditions as Example 4, but utilizing 5% sodium hexametaphosphate, or 5% sodium tripolyphosphate in the pickle solution for one of each pair of hams and regular pickle for the other ham of each pair. The results are shown in the following tables:

TABLE X

*Effect of sodium hexametaphosphate on shrink of ready-to-serve smoked hams*

| Hog No. | Percent Smoking Shrink | |
|---|---|---|
| | Regular Pickle | Regular Pickle + 5% Sodium Hexametaphosphate |
| 1 | 17.5 | 13.5 |
| 2 | 9.9 | 11.0 |
| 3 | 17.5 | 16.4 |
| 4 | 17.2 | 13.8 |
| 5 | 12.1 | 11.3 |
| 6 | 11.8 | 10.1 |
| Average | 14.5 | 12.7 |

Average decrease in shrink is 1.8%.

TABLE XI

*Effect of sodium tripolyphosphate on shrink of ready-to-serve hams*

| Hog No. | Percent Smoking Shrink | |
|---|---|---|
| | Regular Pickle | Regular Pickle + 5.0% Sodium Tripolyphosphate |
| 1 | 11.7 | 10.2 |
| 2 | 11.7 | 12.4 |
| 3 | 10.2 | 10.4 |
| 4 | 10.0 | 8.0 |
| 5 | 9.9 | 7.8 |
| 6 | 10.4 | 9.4 |
| Average | 10.7 | 9.7 |

Average decrease 1.0%.

It will be noted from Table VIII, Example 4, that 2.2% trisodium phosphate gave an average smoking shrink of 9.6% as compared with 12.7% for 5% sodium hexametaphosphate (Table X) and 9.7% for 5% sodium tripolyphosphate (Table XI). The average decrease in shrink as compared with the control hams was better in every instance with trisodium phosphate, 2.2% reduction in shrink as compared with 1.8 for sodium hexametaphosphate and 1.0 for sodium tripolyphosphate.

EXAMPLE 7

A further series of tests was run under the same conditions and with the same curing procedure set forth in Example 5, utilizing a regular pickle for one picnic of each pair of a number of picnics and pickle containing 5% sodium hexametaphosphate, 5% tripolyphosphate, or 5% disodium phosphate for the other picnic of the pair. Due to the low solubility of the disodium phosphate, it was not completely in solution in the pickle used. In this series of tests, the percent yield of the ready-to-serve smoked picnics as compared to fresh weight was determined. The following tables show the test results:

TABLE XII

*Effect of sodium hexametaphosphate on yield of ready-to-serve smoked picnics*

| Hog No. | Percent Yield From Fresh Weight | |
|---|---|---|
| | Regular Pickle | Regular Pickle + 5.0% Sodium Hexametaphosphate |
| 1 | 96.6 | 97.9 |
| 2 | 94.2 | 95.8 |
| 3 | 97.4 | 97.0 |
| 4 | 97.9 | 100.0 |
| Average | 96.8 | 97.8 |

Average increase in yield due to use of 5% of sodium hexametaphosphate is 1.0%.

TABLE XIII

*Effect of sodium tripolyphosphate on yield of ready-to-serve smoked picnics*

| Hog No. | Percent Yield from Fresh Weight | |
|---|---|---|
| | Regular Pickle | Regular Pickle + 5.0% Sodium Tripolyphosphate |
| 1 | 97.0 | 98.1 |
| 2 | 98.6 | 100.2 |
| 3 | 99.8 | 102.0 |
| 4 | 97.1 | 97.8 |
| Average | 97.6 | 99.9 |

Average increase in yield due to use of 5% of sodium tripolyphosphate is 2.3%.

TABLE XIV

*Effect of disodium phosphate on yield of ready-to-serve smoked picnics*

| Hog No. | Percent Yield from Fresh Weight | |
|---|---|---|
| | Regular Pickle | Regular Pickle + 5.0% Disodium Phosphate |
| 1 | 97.2 | 98.8 |
| 2 | 96.0 | 99.1 |
| 3 | 97.8 | 96.9 |
| 4 | 97.8 | 103.0 |
| Average | 97.1 | 100.0 |

Average increase in yield due to use of 5% disodium phosphate is 2.9%.

By comparing Table IX, Example 5, with the results in Tables XII, XIII, and XIV, it is observed that an average yield of 101.0% was obtained with 2.2% trisodium phosphate, as compared with 97.8% for 5% sodium hexametaphosphate, 99.9% for 5% sodium tripolyphosphate, and 100.0% for 5% disodium phosphate. The average increase in yield over that of the control picnics was in each instance better with trisodium phosphate than that obtained with the other phosphates. Thus, better results were obtained with less than one-half the amount of phosphate, and no solubility difficulties or crystal deposition were encountered.

EXAMPLE 8

In a further series of tests, a number of hams were arterially pumped with 10% of a pumping pickle and further cured and processed, in the manner set forth in Example 1, to provide a cooked product. In each instance, one pair of hams was arterially pumped with a pumping pickle containing 2.2% trisodium phosphate while the other ham of the pair was pumped with a similar pickle containing either 5% sodium hexametaphosphate, 5% sodium tripolyphosphate, 5% disodium phosphate, 5% tetrasodium pyrophosphate, or .56% of a commercial phosphate mixture designated as "V." The results of this direct comparison are shown in the following tables:

TABLE XV

*Sodium hexametaphosphate, 5% in pickle vs. T.S.P., 2.2% in pickle*

COOKED HAMS

| Hog No. | Ham | Treatment | Percent Cooking Shrink |
|---|---|---|---|
| 1 | Right | 5% S.H.M.P. | 15.2 |
| 2 | do | do | 11.9 |
| 3 | do | do | 14.3 |
| 4 | do | do | 20.7 |
| Average | | | 15.5 |
| 1 | Left | 2.2% T.S.P. | 10.3 |
| 2 | do | do | 9.5 |
| 3 | do | do | 12.6 |
| 4 | do | do | 11.4 |
| Average | | | 10.9 |

ORGANOLEPTIC RATINGS

| | Prefer S.H.M.P. | Prefer T.S.P. | No Preference |
|---|---|---|---|
| Slightly Better | 1 | 1 | |
| Mod. Better | | 5 | |
| Decidedly Better | | 2 | |
| Total | 1 | 8 | nil |

The trisodium phosphate (T.S.P.) gives a very sizeable decrease in cooking shrink, as compared to sodium hexametaphosphate (S.H.M.P.). The organoleptic rating by a panel of nine shows an 8 to 1 preference for the trisodium phosphate product.

TABLE XVI

*Sodium tripolyphosphate, 5% in pickle, vs. T.S.P., 2.2% in pickle*

COOKED HAMS

| Hog No. | Ham | Treatment | Percent Cooking Shrink |
|---|---|---|---|
| 5 | Right | 5% S.T.P.P. | 12.5 |
| 6 | do | do | 9.5 |
| 7 | do | do | 9.5 |
| 8 | do | do | 13.8 |
| Average | | | 11.3 |
| 5 | Left | 2.2% T.S.P. | 10.4 |
| 6 | do | do | 10.6 |
| 7 | do | do | 12.1 |
| 8 | do | do | 13.4 |
| Average | | | 11.6 |

ORGANOLEPTIC RATINGS—PANEL OF 11

| | Prefer S.T.P.P. | Prefer T.S.P. | No Preference |
|---|---|---|---|
| Slightly Better | 2 | 2 | |
| Mod. Better | 2 | 2 | |
| Decidedly Better | 1 | 1 | |
| Total | 5 | 5 | 1 |

From the foregoing data it may be observed that for cooked hams the use of less than one-half the amount of trisodium phosphate as compared with the more expensive sodium tripolyphosphate produces substantially the same result.

TABLE XVII

Disodium phosphate, 5% in pickle, vs. T.S.P., 2.2% in pickle

COOKED HAMS

| Hog No. | Ham | Treatment | Percent Cooking Shrink |
|---|---|---|---|
| 9 | Right | 5% D.S.P. | 10.8 |
| 10 | do | do | 8.3 |
| 11 | do | do | 11.7 |
| 12 | do | do | 7.4 |
| Average | | | 9.5 |
| 9 | Left | 2.2% T.S.P. | 8.9 |
| 10 | do | do | 10.0 |
| 11 | do | do | 10.4 |
| 12 | do | do | 6.8 |
| Average | | | 9.0 |

ORGANOLEPTIC RATINGS—PANEL OF 9

| | Prefer D.S.P. | Prefer T.S.P. | No Preference |
|---|---|---|---|
| Slightly Better | | 1 | 2 |
| Mod. Better | | 1 | 4 |
| Decidedly Better | | | 1 |
| Total | | 2 | 7 | nil |

The D.S.P. was not soluble in 5% concentration at 50° F. The pickle temperature had to be raised to 95° F. to keep this substance in solution. In addition, it tends to crystallize later on the surface of the ham in coarse, sandy crystals.

The T.S.P. gives a slight decrease in shrink when compared with D.S.P. Organoleptically, the T.S.P. is definitely superior.

TABLE XVIII

Tetrasodium pyrophosphate, 5% in pickle, vs. T.S.P., 2.2% in pickle

COOKED HAMS

| Hog No. | Ham | Treatment | Percent Cooking Shrink |
|---|---|---|---|
| 13 | Right | 5% T.S.P.P. | 8.7 |
| 14 | do | do | 8.7 |
| 15 | do | do | 9.9 |
| 16 | do | do | 11.1 |
| Average | | | 9.6 |
| 13 | Left | 2.2% T.S.P. | 12.6 |
| 14 | do | do | 10.6 |
| 15 | do | do | 12.7 |
| 16 | do | do | 13.3 |
| Average | | | 12.3 |

ORGANOLEPTIC RATINGS—PANEL OF 9

| | Prefer T.S.P.P. | Prefer T.S.P. | No Preference |
|---|---|---|---|
| Slightly Better | 1 | 1 | |
| Mod. Better | 1 | 2 | |
| Decidedly Better | 1 | | |
| Total | 3 | 3 | 3 |

The T.S.P.P. was not soluble in 5% concentration at any practical pumping temperature and "spray" injection was required directly into the muscle rather than the preferred method of pumping through the vascular system. While the T.S.P.P. provided a relatively low cooking shrink and an organoleptically acceptable product, its low solubility mitigates against its use.

TABLE XIX

Commercial phosphate mixture "V" at recommended usage concentration of 0.56% in pickle, vs. T.S.P., 2.2% in pickle

COOKED HAMS

| Hog No. | Ham | Treatment | Percent Cooking Shrink |
|---|---|---|---|
| 17 | Right | 0.56% "V" | 13.9 |
| 18 | do | do | 16.6 |
| 19 | do | do | 16.3 |
| 20 | do | do | 14.6 |
| Average | | | 15.35 |
| 17 | Left | 2.2% T.S.P. | 10.6 |
| 18 | do | do | 15.5 |
| 19 | do | do | 13.7 |
| 20 | do | do | 12.9 |
| Average | | | 13.2 |

ORGANOLEPTIC RATINGS—PANEL OF 9

| | Prefer "V" | Prefer T.S.P. | No Preference |
|---|---|---|---|
| Slightly Better | 2 | 4 | |
| Mod. Better | | | |
| Decidedly Better | | 1 | |
| Total | 2 | 5 | 2 |

In Table XIX a commercial phosphate mixture "V" is compared to T.S.P. Both phosphates were readily soluble in the concentrations in which they were used, at 50° F.

The T.S.P. gave a lower shrink than the mixture "V," and was organoleptically preferred.

From the foregoing examples and tables providing comparisons on paired cuts of meat, it may be observed that 2.2% trisodium phosphate in every instance provides better yields, less loss in cooking and smoking shrink, and an organoleptically preferred product as compared with regular pickle, and in most instances provides better results than other phosphates even when used in less than one-half the concentration. Thus, 2.2% trisodium phosphate provided better yields of spray-pumped ready-to-serve smoked picnics than did 5% of either sodium hexametaphosphate, sodium tripolyphosphate or disodium phosphate. Trisodium phosphate also provided a greater decrease in smoking shrink than either sodium hexametaphosphate or disodium phosphate in the case of artery-pumped ready-to-serve smoked hams when used at a concentration of 2.2% as compared with a concentration of 5% utilized with the other phosphates. Trisodium phosphate further provided less cooking shrink than sodium hexametaphosphate in cooked hams again using less than one-half the concentration. It is organoleptically preferred as may be noted from the results of the test panels. 2.2% trisodium phosphate permitted about the same shrink as 5% sodium tripolyphosphate in cooked hams, and organoleptically there was no difference. The 2.2% trisodium phosphate provided a slightly lower cooking shrink than 5% disodium phosphate in cooked hams, and, moreover, organoleptically the trisodium phosphate is preferred.

It is further to be noted that low solubility of some of the phosphates at their recommended concentration presents a real difficulty in pumping, and tends to cause crystallization of the salt on the processed meat. Trisodium phosphate is highly soluble and presents no such difficulties. Trisodium phosphate at 2.2% concentration is somewhat less effective than 5% tetrasodium pyrophosphate in reducing the shrinkage of cooked hams. Tetrasodium pyrophosphate, however, was not suitable for normal pumping operations, due to its low solubility.

Organoleptically, both phosphates provided the same result.

The trisodium phosphate pickle was found to be much more effective than the commercial phosphate mixture "V" in reducing the shrinkage of cooked hams when both were employed at recommended concentrations. Moreover, the trisodium phosphate product was preferred organoleptically.

From the foregoing results, it will be noted that trisodium phosphate provides the most versatile of all of the treating compositions, with the most uniformly advantageous results, as well as being the easiest to use because of its relatively high solubility. Trisodium phosphate, moreover, is less costly than any of the previously proposed phosphate alkalies.

While the invention has been described in connection with the processing of hams and picnics, it is to be understood that this is for illustrative purposes only, and the process is equally suitable for use with other meats, such as bacon, butts, cured tongue, cured beef, etc., the invention being limited only by the scope and spirit of the appended claims.

I claim:

1. In a process for producing cured pork products, the steps comprising: pumping fresh pork cuts with an aqueous pickle solution containing sodium chloride, sugar, sodium nitrite, sodium nitrate and about 1 to about 4 percent by weight of trisodium phosphate calculated as $Na_3PO_4$, and heat-processing the so-treated cuts.

2. In a process for producing cured pork products, the steps comprising: pumping fresh pork cuts with an aqueous pickle solution containing sodium chloride, sugar, sodium nitrite, sodium nitrate and about 2.2 percent by weight of trisodium phosphate calculated as $Na_3PO_4$, and heat-processing the so-treated cuts.

3. In a process for producing cured, cooked hams, the steps comprising: pumping fresh hams with at least about 10 percent by weight of an aqueous pickle solution containing sodium chloride, sugar, sodium nitrite, sodium nitrate and about 1 to about 4 percent by weight of trisodium phosphate calculated as $Na_3PO_4$, and cooking the so-treated hams.

4. In a process for prepared cured, smoked hams, the steps comprising: pumping fresh hams with at least about 10 percent by weight of an aqueous pickle solution containing sodium chloride, sugar, sodium nitrite, sodium nitrate and about 1 to about 4 percent by weight of trisodium phosphate calculated as $Na_3PO_4$, and smoking the so-treated hams.

References Cited in the file of this patent

UNITED STATES PATENTS

| | | |
|---|---|---|
| 1,920,222 | Taylor | Aug. 1, 1933 |
| 2,513,094 | Hall | June 27, 1950 |
| 2,528,204 | Zwosta | Oct. 31, 1950 |
| 2,596,067 | Brissey | May 6, 1952 |
| 2,770,548 | Hall et al. | Nov. 13, 1956 |